US005706503A

United States Patent [19]
Poppen et al.

[11] Patent Number: 5,706,503
[45] Date of Patent: Jan. 6, 1998

[54] METHOD OF CLUSTERING MULTI-DIMENSIONAL RELATED DATA IN A COMPUTER DATABASE BY COMBINING THE TWO VERTICLES OF A GRAPH CONNECTED BY AN EDGE HAVING THE HIGHEST SCORE

[76] Inventors: Richard F. Poppen, 1653 Fairorchard Ave., San Jose, Calif. 95125; Brian E. Smartt, 1666 Honfleur Dr., Sunnyvale, Calif. 94087; Linnea A. Dunn, 1030 Ringwood Ave., Menlo Park, Calif. 94025; Frank J. Derose, 5182 Lawler Ave., Fremont, Calif. 94536

[21] Appl. No.: 245,690

[22] Filed: May 18, 1994

[51] Int. Cl.$^6$ .................. G06F 7/00; G06F 17/18
[52] U.S. Cl. .......... 395/611; 395/603; 395/605; 395/613; 395/614; 395/776; 395/779
[58] Field of Search .................. 395/600, 700, 395/603, 611, 613, 614, 776, 779, 605

[56] References Cited

U.S. PATENT DOCUMENTS

| | | | |
|---|---|---|---|
| 5,212,794 | 5/1993 | Pettis et al. | 395/700 |
| 5,249,295 | 9/1993 | Briggs et al. | 395/650 |
| 5,331,554 | 7/1994 | Graham | 395/605 |
| 5,396,631 | 3/1995 | Hayashi | 395/707 |
| 5,418,717 | 5/1995 | Su | 395/759 |
| 5,457,799 | 10/1995 | Srivastava | 395/709 |
| 5,495,605 | 2/1996 | Cadot | 395/604 |

*Primary Examiner*—Thomas G. Black
*Assistant Examiner*—Jean R. Homere

[57] ABSTRACT

A method of clustering multi-dimensional related data performed by identifying features from a collection of data, each of said features being represented by a vertex, selecting pairs of features that it is desirable to cluster together, connecting the pair of vertices representing every selected pair of features by an edge, assigning a score to every edge according to a predetermined formula, selecting an edge having the highest score, creating a new vertex by merging the vertices connected by the selected edge, creating new edges between the new vertex and the vertices previously connected to the merged vertices, and repeating this procedure until every edge has a predetermined score.

22 Claims, 5 Drawing Sheets

METHOD OF CLUSTERING MULTI-DIMENSIONAL RELATED DATA IN A COMPUTER DATABASE BY COMBINING THE TWO VERTICLES OF A GRAPH CONNECTED BY AN EDGE HAVING THE HIGHEST SCORE

BACKGROUND OF THE INVENTION

1. Field of the Invention

The present invention relates in general to methods of storing data in a database and in particular to a method of clustering multi-dimensional related data such as, for example, geographic map data, in a database in a manner which is efficient in terms of the resources and space required for clustering and which results in reducing the time required to retrieve selected records or data from the database.

2. Description of the Related Art

Since their invention, computers have been used to search through or otherwise process collections of data too large to be held in main memory in their entirety at once. Programs have, therefore, long dealt with large masses of data by reading the items of data in a file sequentially, in chunks. When a file is to be processed by handling each record separately, in sequence, the organization of a file is not very important. When a file is intended to be used by repeatedly finding a specified item of interest and operating on it, the organization of the file can be very important in making that operation efficient.

For that purpose, the records in a file are often sorted according to a specified order, so that particular records can be found by searching for them by their position in that order. For example, a bank may sort a file of information about its depositors by account number. Then the record for a particular account can be found easily by its number. A file may be indexed according to more than one sequence, so that records can be found by more than one attribute. There is a very large body of literature that deals with indexing, sorting, and searching of data.

For most file organization methods, data is sorted according to some attribute, like customer name. Ties in the sort order might be broken by using other ordering criteria, but the sort is still intrinsically one-dimensional. The organization is such that, for any two records, one comes before the other. This is convenient for the storage of data in a computer, because the memory devices of computers are also intrinsically one-dimensional. The records come in a fixed sequence, and, for many storage devices, it takes significant time to move from one point in a file's sequence to another. (Even though the surface of a disk is two-dimensional, the data on the disk is stored in a one-dimensional sequence.)

When the data being stored is intrinsically two-dimensional (or of any dimension greater than 1) such as, for example, geographic map data, this organization is not so convenient. Often one wants to put records for objects that are near each other in the appropriate multi-dimensional space near each other in the file, because the file will be used in such a way that one often goes from the record for one object to the record for a nearby object. However, organizing the file in a way that supports this is not easy. If, for example, one has a list of arbitrarily chosen locations in a city, there is no method of arranging them that necessarily puts the records for points that are near each other on the ground near each other in the file. The best that one can hope for is to put as many related records as possible near each other in the file.

Certainly, sorting by one coordinate and breaking ties with the other is not a very good approach. Imagine points in a city sorted by longitude, with ties broken by sorting by latitude. Then, for example, the records for points of interest that are near each other on the ground might be separated in the file by the records for many points that are between the points of interest in longitude but are at the other end of the city in latitude.

Accordingly, various techniques have been devised for collecting into clusters data records representing objects from a space that is intrinsically multi-dimensional. Many of them are purely geographical (or geometric), and collect together records for objects that are near each other but unrelated. Many others are inefficient in terms either of resources used in clustering or of use of space in the data file. The present invention is of a new method of clustering related data from a multi-dimensional space.

There are many methods of clustering multi-dimensional data, especially two-dimensional data such as map data, in the literature. Most are top-down methods, such as the method of quad-trees, which successively subdivide the data to be clustered until the resulting clusters are as small as necessary. These methods tend to produce clusters with significant variation in size, or to produce subdivisions that have different numbers of levels in different regions of the data, or both. Other bottom-up methods tend to operate locally, filling one cluster before moving on to construct the next. This also tends to result in significant imbalances in cluster sizes and in irregular shapes. The method of the present invention is bottom-up but global, resulting in well-balanced and well-shaped clusters over the entire database.

SUMMARY OF THE INVENTION

In view of the foregoing, a principal object of the present invention is a method of clustering multi-dimensional related data such as, for example, geographic map data, in a computer database which is faster and more efficient in terms of data retrieval and storage than prior known methods. In a preferred embodiment thereof, the method of the present invention comprises the following steps:

a. establishing a vertex in a graph for every object among a collection of objects of interest in a computer database so as to provide a graph comprising a plurality of vertices;

b. connecting selected pairs of said plurality of vertices by an edge;

c. providing each of the edges connecting the unsuppressed vertices with a score which is a measure of how desirable it is to combine the vertices associated therewith;

d. selecting the two vertices connected with the edge having the best score;

e. combining said two vertices;

f. creating a new merged vertex and edges which are themselves provided with a score; and g. repeating steps (d) through (f) until a predetermined terminating condition is reached.

In another embodiment of the present invention, the above described method further comprises the step of suppressing those vertices and associated edges representing objects for which there is no desire to maintain data in the database so as to leave a plurality of vertices representing features for which data is present in the database.

In another embodiment of the present invention, the above described method further comprises the step of gen-

3 erating and maintaining a list of vertices in which there is listed for each vertex the score of the best edge connected to that vertex and the other vertex to which that best edge connects.

In still another embodiment of the present invention the above described step of generating and maintaining a list of vertices comprises the step of sorting said list by the best edge score.

To facilitate the various above-described methods, the following procedures are sometimes, if not always, used:

a. lists of vertices and their accompanying scores are compiled with the highest scores being at the top of the list.

b. clusters are themselves clustered in an iterative process with successively larger size limits/restrictions being placed on their combined sizes after each iteration so that a certain degree of uniformity in the size of the data records can be maintained.

In another embodiment of the present invention there is provided a method for combining clusters in which the score of each newly created edge corresponds to the number of edges replaced by the newly created edge. Beginning with combining clusters connected by edges having the highest value, the combining continues until the combined clusters reach a predetermined size.

BRIEF DESCRIPTION OF THE DRAWINGS

The above and other objects, features and advantages of the present invention will become apparent from the following detailed description of the accompanying drawings, in which.

4

DESCRIPTION OF THE PREFERRED EMBODIMENTS

As will be used herein, the term "feature" means a single indivisible object described by a database, e.g., a section of a river, a block of a street, a lake, a segment of a political boundary, etc.

The terms "cluster" and "vertex" each mean a collection of one or more features. The term "vertex" is used herein in reference to a collection of one or more features when that collection of features is being used as an element in a graph. The term "cluster" is used herein in reference to a collection of one or more features when that collection is being used as a collection of features to be stored together in a datafile. As used herein, there is no distinction between a cluster and a vertex.

Figure 1:
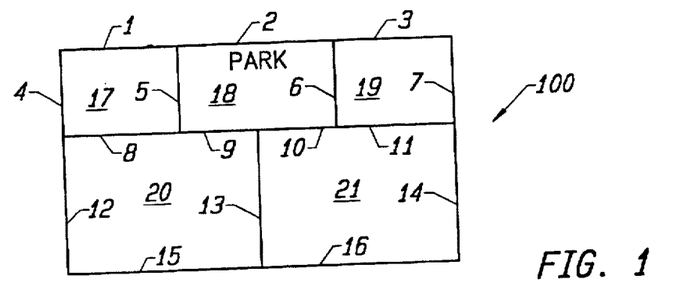
FIG. 1 is a representation of a section of a map of a city.

Referring to FIG. 1, there is shown a section of a two-dimensional surface, i.e., a map of a city designated generally as 100 comprising a plurality of line segments 1–16 representing roads/streets and five areas designated 17–21 which are bounded by the line segments 1–16. Some or all of the line segments could represent features to be represented in the database for subsequent retrieval, e.g., streets, political boundaries, rivers, etc. In this example, each of these line segments represents a segment of a street. Also, some or all of the areas could represent features to be represented in the database for subsequent retrieval, e.g., a park, a lake, an office complex, etc. In this example, area 18 represents a park, while the remaining areas 17, 19, 20, and 21 do not represent features to be stored in the database.

Figure 2:
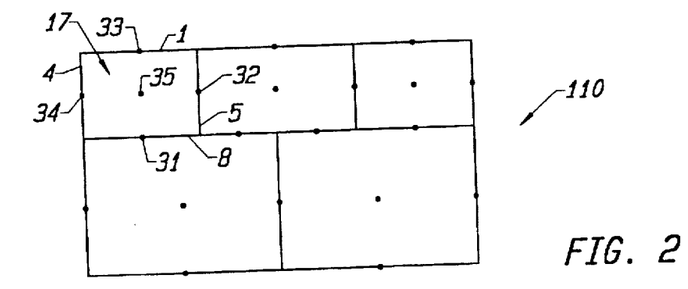
FIG. 2 is a graph showing vertices for each area and line segment corresponding to features on the map of FIG. 1.

Referring to FIG. 2, there is shown a graph designated generally as 110 of objects on the map 100. For example, the objects may comprise a section/length of a street, a building, a park, a lake, a boundary of an area, etc. In the graph 110 a vertex, represented by a dot, is provided for every object, i.e., every line segment 1–16 and every area 17–21. For example, for line segments 8, 5, 1 and 4 bounding area 17 there are vertices 31–34, respectively, and for the area 17 a vertex 35. It should be noted that the horizontal and vertical lines 8, 5, 1 and 4 and the like, present in graph 110 and subsequent graphs are construction lines, as distinguished from edges described below, have no significance and are provided merely to facilitate the relative placement of the vertices on the graph 110.

Figure 3:
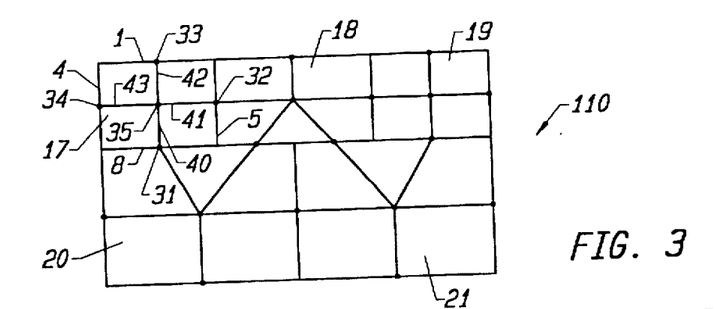
FIG. 3 is a reproduction of the graph of FIG. 2 with the addition of edges connecting the vertex for each area to the vertex for each line segment bounding the area.

Referring to FIG. 3, the vertex for each area is connected to, i.e., associated with, the vertex for each line segment bounding the area. The connection is called an "edge". For example, counting in a counterclockwise direction, there are four edges 40–43 connecting the vertex 35 for the area 17 to the vertices 31–34 for the line segments 8, 5, 1 and 4 of FIG. 1, respectively.

Figure 4:
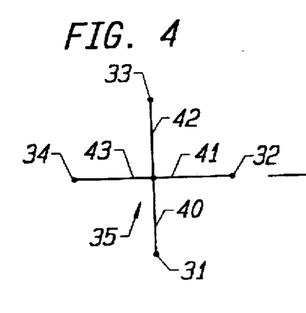
FIGS. 4–6 are a series of drawings illustrating the suppression of a selected vertex.
Figure 5:
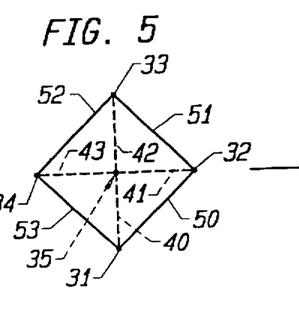
Figure 6:
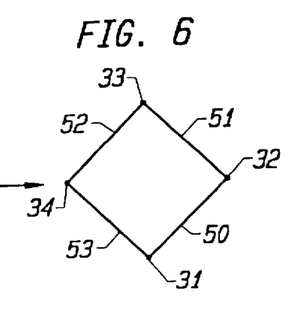
Figure 7:
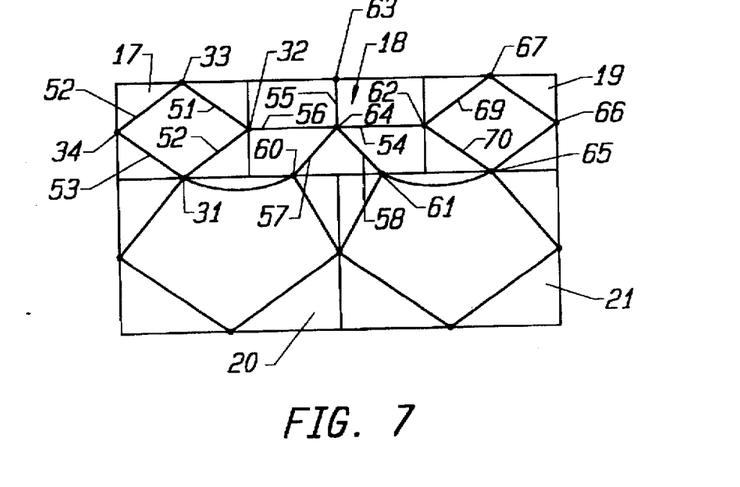
FIG. 7 is a reproduction of the graph of FIG. 3 after selected vertices have been suppressed.

The next step in the method of clustering data according to the present invention is to suppress the vertex for each area and each line segment that is to be omitted from the database, i.e., that does not correspond to data it is desired to subsequently retrieve from the database. Thus, recalling that areas 17, 19, 20 and 21 are not features to be stored in the database, to suppress the vertices corresponding to these areas, the edges connecting the vertices in each of these areas to their neighboring vertices on the line segments bounding the area are removed and replaced by edges interconnecting the neighboring vertices on each of the bounding line segments so that the unsuppressed neighboring vertices connected to the suppressed vertex by adjacent suppressed edges are themselves connected by a newly constructed edge. For example, as seen in both FIGS. 3 and 4, the vertex 35 is connected by edges 40–43 to neighboring vertices 31–34. As shown in FIG. 5 by broken lines and a hollow dot, the vertex 35 and the edges 40–43 in FIGS. 3 and 4 are suppressed by removing them and connecting the vertices 31–34 by edges 50–53, respectively, resulting in the graph fragment shown in FIG. 6. The graph resulting from the suppression of the vertices in the other areas 19, 20 and 21 using the same technique is shown in FIG. 7. Note that some edges are drawn as curved lines and others are drawn as straight lines. The drawing is merely intended as an aid in visualizing the connections between vertices. The actual path of the drawn line has no consequence.

Referring to FIG. 7, a vertex 64 which represents area 18 is connected by edges 54–58 to vertices 62, 63, 32, 60 and 61, respectively. The vertex corresponding to area 19 has been suppressed, but the line segments bounding area 19 are represented by vertices 62, 65, 66 and 67. Vertex 62 is shown connected to its neighboring vertices 64, 65 and 67 by edges 54, 70 and 69, respectively.

Figure 8:
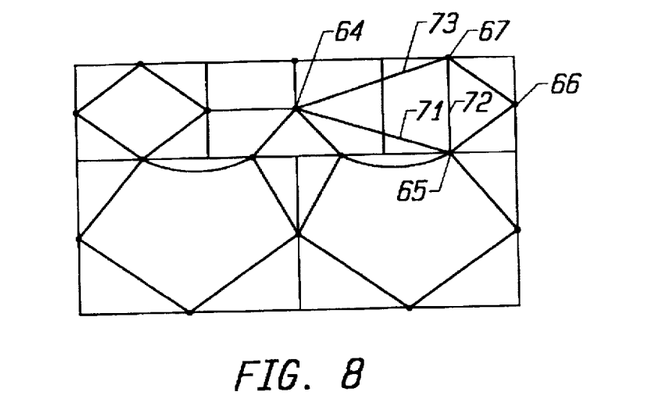
FIG. 8 is a reproduction of FIG. 7 wherein another vertex has been suppressed.

Referring to FIG. 8, if it is desired to suppress the vertex 62 and its associated edges 54, 69 and 70 as shown in FIG. 7, the vertex 62 and the edges 54 69 and 70 are removed and the neighboring vertices 64, 65 and 67 to which they were connected are now connected by edges 71, 72 and 73.

It will now be recognized that every feature in the map which is intended to be subsequently retrieved from the database has a vertex and every vertex represents a feature in the map. Furthermore, features that are adjacent in the map are adjacent in the graph, i.e., they are connected by an edge.

In the following discussion of the present invention, each vertex will represent a cluster comprising one or more features. Initially, before the clusters are combined, each cluster contains just one feature.

Whenever consideration is being given to combining two clusters, e.g., a first and a second cluster, a score (a figure of merit or other value, not necessarily numerical) is given to the combination. The score is a measure of how good or desirable it is to combine the clusters under consideration.

In a first embodiment of the present invention wherein the data is geographical data, the score equals the area of the bounding box of the first cluster plus the area of the bounding box of the second cluster minus the area of the bounding box of the combined clusters.

It should be understood that in this embodiment of the present invention the area of a bounding box of a cluster is the area of the smallest rectangle having borders running north-south and east-west that encloses the cluster, i.e., the actual feature or features represented by a vertex.

Figure 9:
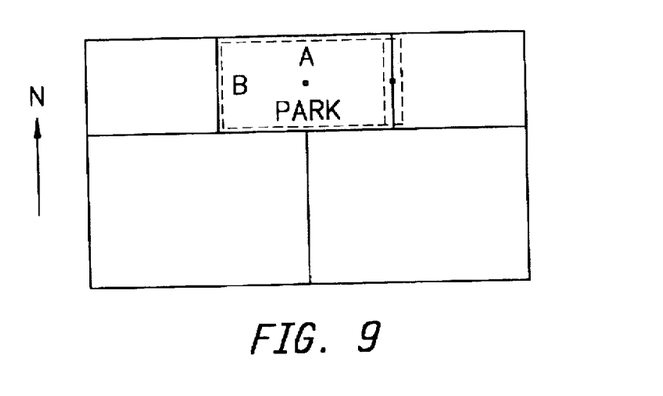
FIG. 9 is a diagram illustrating the bounding boxes of an area and of a line segment according to the present invention.

Referring to FIG. 9, and considering a merger of the park cluster/vertex with the street cluster/vertex on the east side of the park (north being at the top of the page), it can be seen that the area of the bounding box of the park cluster is equal to AB, whereas the area of the bounding box of the street cluster to the east of the park is zero. The area of the bounding box of the street cluster is zero because, while the length of the bounding box is equal to the length of the street segment, i.e., B, the width of the bounding box is zero. Thus, applying the above equation, the score for the merger is AB+0−AB=0. It should be noted that the dashed lines in the figure defining the bounding boxes are slightly displaced from their true positions for reasons of visibility.

Figures 10, 11, 12:
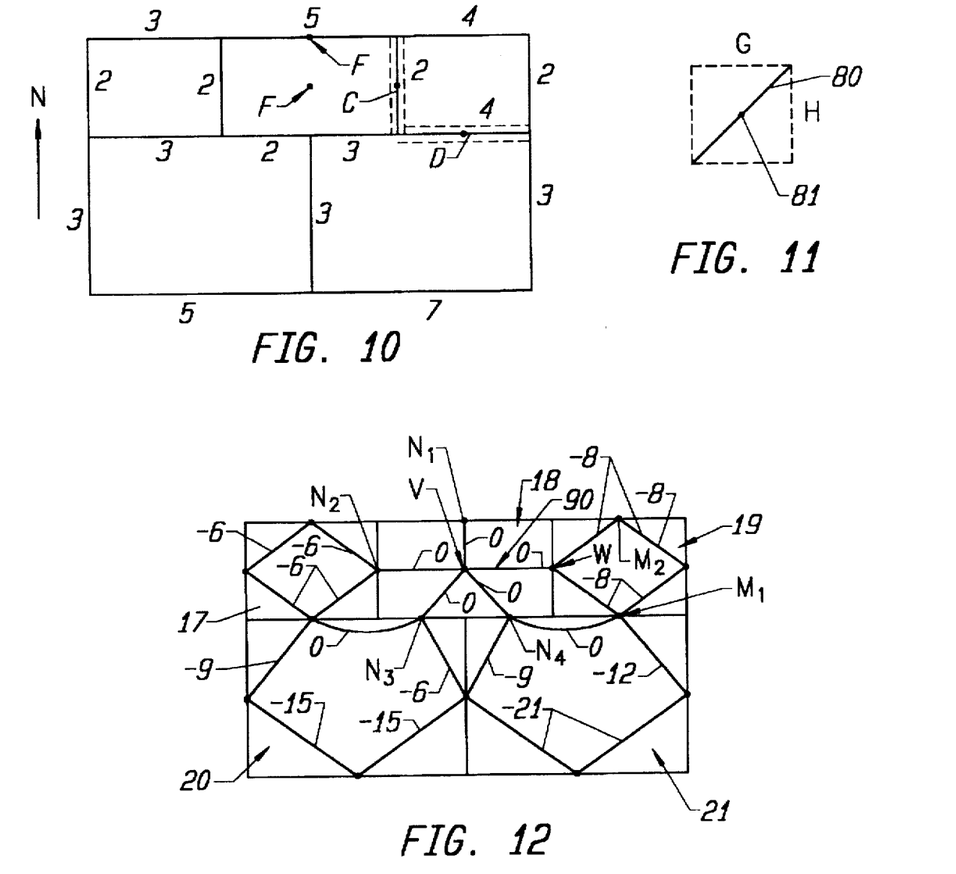
FIG. 10 is a diagram illustrating the bounding boxes of two line segments according to the present invention.
FIG. 11 is a diagram illustrating the bounding box of a diagonal line segment according to the present invention.
FIG. 12 is a reproduction of the graph of FIG. 8 with scores added to selected edges according to the present invention.

Referring to FIG. 10, a value corresponding to its length is placed adjacent to each of the line segments. For example, line segment C east of the park is assigned a value of 2 and a line segment D extending therefrom is assigned a value of 4. If consideration is being given to combining or merging the clusters associated with the line segment C and the line segment D, it will be calculated using the above-described equation that the area of the bounding box of the first cluster, designated C for convenience, will be zero and that the area of the bounding box of the second cluster, designated D for convenience, will be zero but that the area of the bounding box enclosing both clusters will be CD. Recalling that the score for the edge resulting from a merger is the area of the bounding box of the first cluster plus the area of the bounding box of the second cluster minus the area of the bounding box of the combined clusters, it can be seen that the score for merging the clusters C and D corresponding to line segments C and D is calculated as follows:

$$0+0-CD=-CD \text{ or}$$

$$0+0-(2\times 4)=-8$$

It should be noted that the bounding box of a cluster for a line segment is not always zero. For example, referring to FIG. 11, there is shown a diagonal segment 80 having a vertex 81. Since the boundaries of the bounding box have a non-zero extent in a north and south as well in an as east and west direction, it will be seen that the area of the bounding box of the vertex 81 is GH.

As shown in FIG. 12, using the above-described technique, a score is calculated for each edge joining a pair of clusters on the graph. For example, the score for the edge connecting cluster W and cluster M1 resulting from the merger of clusters C and D is, as calculated above, −8.

Once each of the edges in the graph has been scored, the edge with the greatest score is selected. Among the edges illustrated in FIG. 12, the greatest score is zero, all others being a negative value, i.e. less than zero. It should be noted that if more than one edge has the same greatest score, any one of those edges can be selected arbitrarily.

In the above embodiment the method of scoring is such that the best edge, i.e. the edge connecting the clusters that it is most desirable to combine, has the greatest score. It is possible to use other scoring methods, such as one in which the best edge has the lowest score.

After an edge having the greatest score is selected, the task of combining the clusters connected by the edge commences. Combining the clusters involves merging the vertices and combining the lists of features associated with each of the vertices. For example, referring again to FIG. 12, assume it is desired to merge the clusters designated V and W which are connected by the edge designated 90.

For convenience, the vertices connected to the cluster V are designated in a counterclockwise direction by the alphanumeric designators W, $N_1$, $N_2$, $N_3$ and $N_4$. The clusters connected to the vertex W are designated in a counterclockwise direction by the alphanumeric designators V, $M_1$ and $M_2$.

Figure 13:
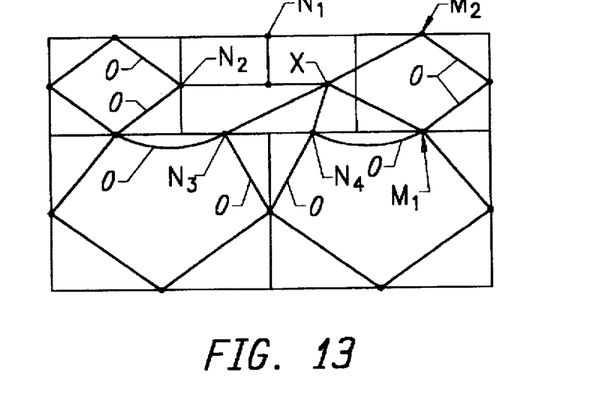
FIG. 13 is a diagram illustrating a merger of two of the vertices of FIG. 12 according to the present invention.

Referring to FIG. 13, the result of combining the clusters, i.e., merging the vertices V and W, is shown wherein a new vertex X is created and all of the edges that connected the vertices $N_1$–$N_4$ to the vertex V and all of the edges that connected the vertices $M_1$ and $M_2$ to the vertex W are now connected to the newly created vertex X. Note that the edges of the new vertex X are connected in the same order as those of the old vertices V and W. Reading counterclockwise, the edges are seen to connect to the vertices connected to V and in the same order, namely $N_1$, $N_2$, $N_3$, $N_4$, and then to the vertices connected to W in the same order, namely $M_1$ and $M_2$. All other edges and vertices in the graph remain undisturbed.

After merging the two vertices as described above, the newly created edges are scored. In this regard it will be noted that only the edges connected to the new vertex X need to be rescored. After the edges are rescored, one of the edges having the highest score is again selected. The clusters connected thereby are combined and their respective vertices are merged, as described above with respect to FIGS. 12 and 13.

The clustering and merging of the vertices continues in this fashion until it is no longer possible to merge two clusters. This occurs, for example, when the list of features associated with the clusters become too big for a record, e.g., the record containing the features of the combined clusters would exceed a predetermined number of bytes, e.g., 8192 bytes, and/or the combined clusters exceed a predetermined geographical area, number of data items contained therein, or the like. When this occurs, the edge between the clusters which it has been determined cannot be combined, is given a score of minus infinity ($-\infty$), instead of using the scoring technique described above. Minus infinity is used because it is the lowest possible score. The combining of clusters is thus terminated when every edge has been given a score of $-\infty$.

In practice, the process of scoring all of the edges and finding the highest scoring edge is slow. To limit re-scoring and thereby speed up the process, a list of vertices is generated. For each vertex in the list, there is listed the vertex's score (that is, the score of the highest-scoring edge associated with that vertex) and the neighboring vertex to which that highest-scoring edge connects. If more than one edge has the same highest score, one such neighboring vertex is chosen arbitrarily. The list of vertices is sorted according to the vertices' scores. For example, referring to FIG. 14, there is shown a graph of a plurality of vertices A–H with arbitrary scores placed adjacent to the various edges connecting pairs of the vertices. It will be noted that the highest scoring edge from vertex C has a score of 2. There are two such edges. One is connected to vertex A and the other to vertex D. In the following list, vertex D is chosen. Thereafter, the vertices are sorted with the vertices having the highest scores being placed at the top of the list and the vertices with the lowest scores appearing at the bottom of the list.

Figure 14:
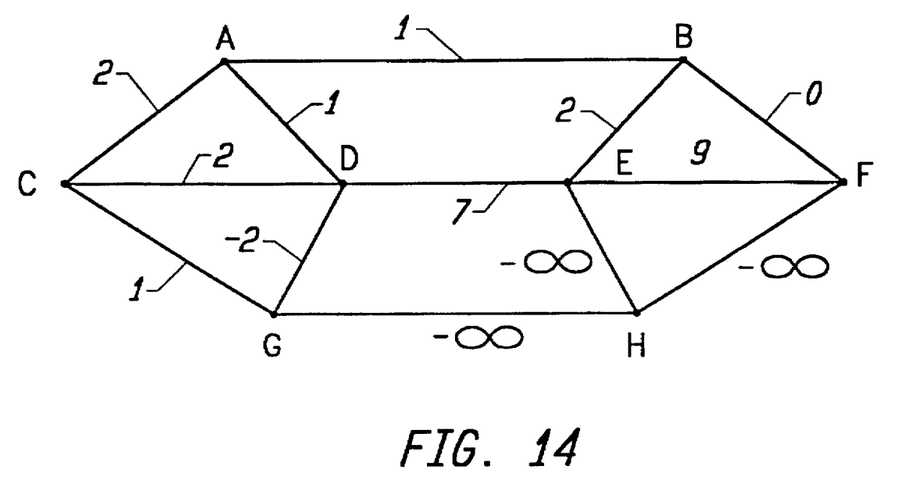
FIG. 14 is a graph containing a plurality of vertices with arbitrary scores adjacent to the various edges connecting pairs of the vertices.

| Vertex | Best Edge Goes To This Vertex | Best Edge's Score |
|---|---|---|
| E | F | 9 |
| F | E | 9 |
| D | E | 7 |
| C | D | 2 |
| A | C | 2 |
| B | E | 2 |
| G | C | 1 |
| H | F | $-\infty$ |

With the list wherein the vertex having the highest score is found at the top of the list, it can be seen that the next merger will comprise the vertices E and F.

Figure 15:
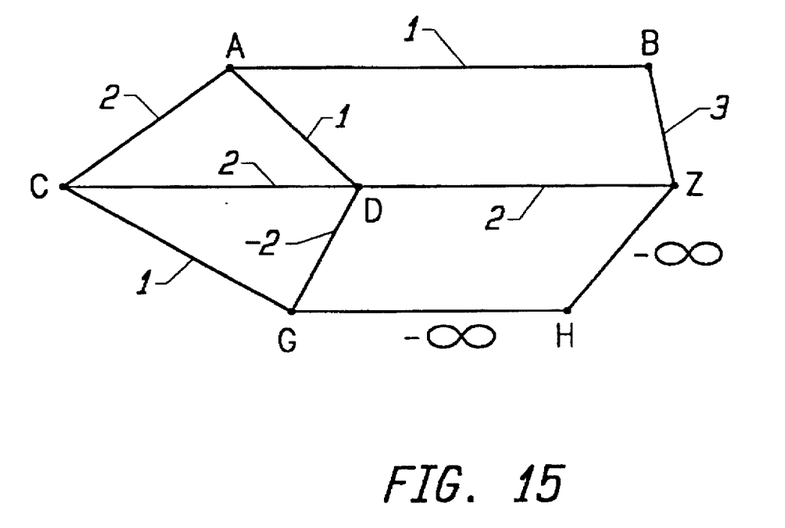
FIG. 15 is a reproduction of the graph of FIG. 14 with two of the vertices of FIG. 14 having been merged and new edges associated therewith created.
Figure 16:
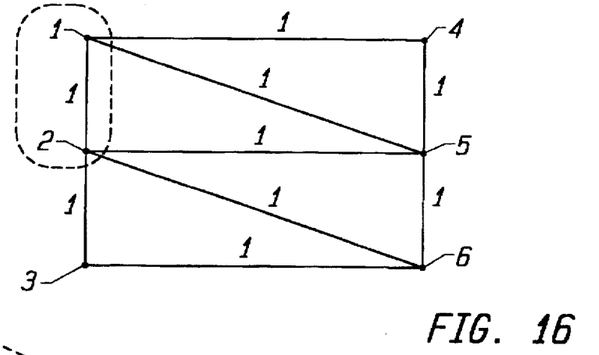
FIG. 16 is a data/cluster graph in accordance with another embodiment of the present invention.

After the vertices E and F are merged so as to create a new vertex Z as shown in FIG. 15, the newly created edges are scored. Note that the score for the newly created edges connected to vertex Z are arbitrary for purposes of this example. It will again be noted that the scores of the unaffected edges remain the same and that only those edges connected to vertex Z need to be scored. For purposes of illustration, it is assumed that the scores for the edges connected to the new vertex Z are as follows:

B–Z 3

D–Z 2

H–Z $-\infty$

In the list of vertices described above, the listings for E and F are deleted since the vertices E and F are gone.

Next, a listing for Z is added, and its position and the positions of Z's neighboring vertices, i.e., B, D and H, are adjusted as necessary according to the magnitude of their scores. It will be seen that the new listing is as follows:

| Vertex | Best Edge Goes To This Vertex | Best Edges Score |
|---|---|---|
| B | Z | 3 |
| Z | B | 3 |
| D | Z | 2 |
| C | D | 2 |
| A | C | 2 |
| G | C | 1 |
| H | Z | $-\infty$ |

In some applications the intended use of the data being clustered is such that one wants to aggregate sets of clusters to form larger clusters in a hierarchical fashion. That is, one wants to form one set of clusters, then to form another set of clusters in such a way that the set of elements of each cluster in the second clustering is the union of the sets of elements of some collection of clusters from the first clustering. In this case, one begins the second clustering operation with the graph in the state in which it was left by the first clustering operation, rather than with one data element per vertex, and reconstructs the edges' priority queue as necessary if the edge scoring mechanism has changed.

Alternatively, in some applications the intended use of the data being clustered is such that one wants to form higher-level clusters whose elements are themselves lower-level clusters. In this case, one simply uses the present invention again. In the second clustering process, the data elements are the clusters from the first clustering process, rather than the data elements clustered in the first clustering process.

In other applications the nature of the data being clustered is such that the method as described above may produce clusters that vary too widely in size. It may then be useful to apply the technique iteratively, with successively larger limits. For example, suppose that a cluster is allowed to contain at most N bytes. One might cluster the data once, limiting the size of each cluster to N/16 bytes; then again, aggregating these clusters to form larger clusters with a size limited to N/4 bytes; then again, aggregating those larger clusters to form still larger clusters with a size limited to N bytes. Experience has shown that this iterative process results in more uniformly sized clusters.

As discussed above, the determination of whether two clusters can be combined often hinges on whether the size of the result would be too great. In these cases, often the format in which the data is stored is such that combining two clusters results in a new cluster of a size that is different from the sum of the sizes of the two original clusters. It may be computationally quite expensive to compute the exact size of the combined cluster, but much easier to compute an estimated upper bound on the size of the combined cluster.

In such cases, one can store with each vertex an estimated upper bound on the size of its cluster, which one then uses to evaluate the combinability of clusters conservatively, sometimes rejecting the combination of two clusters because the size estimates indicate erroneously that the result may be too large. This can result in a significant saving of computational effort. One can combine this approach with occasionally computing the true, accurate size of each cluster, for example, once at the beginning of each iterative or hierarchical step, or at randomly chosen times during the clustering process.

In still other applications, the nature of the data being clustered is such that one discovers clusters whose combination is desirable part way through the clustering process. For example, if the data being clustered is geographic, and minimizing the extent of overlap of clusters is desirable, one may find that after some aggregation has taken place, there are two clusters, whose vertices are not connected by an edge, such that the geographic extent of one entirely contains the geographic extent of the other. It then becomes desirable to add an edge between the clusters' vertices.

One can add a step in which one looks for such pairs of clusters. Unfortunately, this operation can be computationally quite expensive when one checks every pair of vertices in the entire clustering graph. However, if one is maintaining the clustering graph as a planar graph, one can find many such pairs of vertices quickly by examining each face of the graph (a face of a planar graph is a region of the plane bounded by edges of the graph) and checking every pair of non-adjacent vertices in the face. Moreover, if one then adds an edge, the planarity of the clustering graph is preserved.

In another embodiment of the invention, the data to be clustered themselves represent the vertices of a graph. The vertices that it is desirable to cluster together are just those that are connected by an edge in the original graph. In this case, the original graph itself can be used as the initial state of the clustering graph.

In this embodiment, the goal in clustering is to minimize the total number of edges of the original graph that connect vertices in different clusters. To accomplish this, each edge in the clustering graph will have associated with it the number of edges in the original graph represented by that edge. This number is called the "weight" of the edge. The means of storing the clustering graph is modified so that this weight can be stored along with each edge. Now the goal is to minimize the total weight of all edges in the clustering graph when clustering is completed.

First, the score of each edge in the clustering graph is made the same as its weight. Then two clusters are combined. The original graph's edges that formerly ran between the two clusters now stay within a single cluster. No other edges between clusters are affected. When two clusters are combined that have a common neighbor, the weight of the new vertex's edge to that neighbor is made equal to the sum of the previous edges' weights. As a result, at each step, the edge weights and the number of original edges between the clusters remain synchronized.

Because in this embodiment there is no notion of geographical compactness, there is no need to maintain the clustering graph as a planar graph.

Referring to FIGS. 16–19, there is shown a combination data graph and clustering graph comprising six vertices 1–6 which are interconnected by a plurality of horizontal, vertical and diagonal lines, i.e., edges. For purposes of illustration the vertices 1 and 2 will be merged as shown by the broken lines surrounding vertices 1 and 2.

Figure 17:
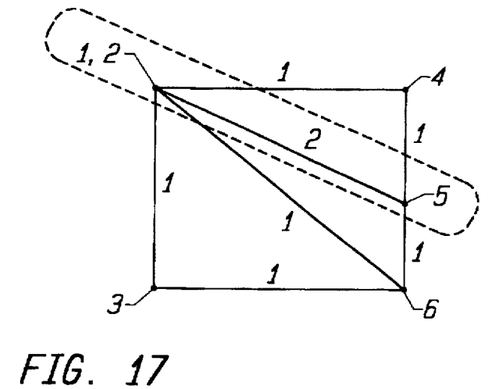
FIG. 17 is a cluster graph which is a reproduction of the graph of FIG. 16 after the merger of a pair of vertices and their associated edges.

Referring to FIG. 17, after the vertices 1 and 2 are merged, a new vertex designated 1,2 is created together with new edges resulting therefrom. In this embodiment, the score for the newly created edge will be equal to the sum of the scores of the edges replaced by the newly created edge. To determine that sum, it is necessary to refer to the previous graph. There it can be seen that the newly created edges running between 1,2 and 5 and between 1,2 and 6 have the score 2 and 1, respectively. The reason why the edge running from 1,2 to 5 has the score 2 can be seen from FIG. 16 wherein one edge with a score of 1 ran from 2 to 5 and another edge also with a score of 1 ran from 1 to 5, the sum being 2. In the other cases, namely 1,2 to 4 and 1,2 to 3, only one edge, with a score of 1, ran between the respective vertices.

The next step in the method of this embodiment of the present invention is to merge again those clusters interconnected by an edge having the greatest score, i.e., the edge connecting 1,2 and 5.

Figure 18:
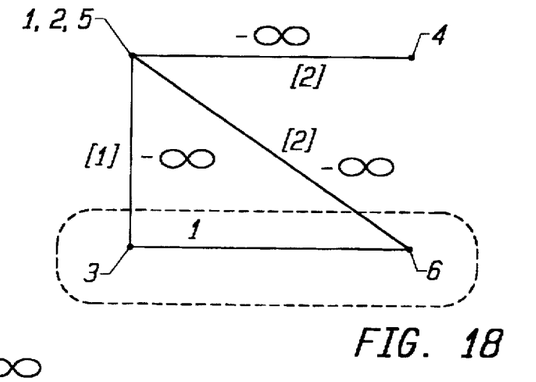
FIG. 18 is a reproduction of the graph of FIG. 17 after the merger of a pair of vertices and their associated edges.

Referring to FIG. 18, in the process of merging the vertices 1,2 and 5 a new vertex is created designated 1,2,5 which results in the creation of a new edge between 1,2,5 and vertex 6.

Referring to FIG. 17, to calculate the new scores for the edges in the cluster graph of FIG. 18, it will be seen that the edge between vertex 1,2,5 and vertex 4 equals 2. This is due to the fact that before the merger, two edges connected the vertex 4 to vertex 1,2 and vertex 5. Similarly, the newly created edge between vertex 1,2,5 and vertex 6 has a score of 2 because, as shown in FIG. 17, vertex 6 was connected to 5 by one edge having a score of 1 and to vertex 1 by another edge having a score of 1. The score of the edges connecting vertex 1,2,5 and vertex 3 and the edge connecting vertex 3 and vertex 6 remain equal to 1.

Assume for purposes of illustration that the combined vertices 1,2,5 create the largest possible cluster such that no other vertex can be combined with the cluster 1,2,5. In that case, as described above, each of the edges connecting the vertex 1,2,5 to other vertices is given the score of minus infinity ($-\infty$) to reflect that fact. In that case, the only vertices that can be further combined are the vertices 3 and 6.

Figure 19:
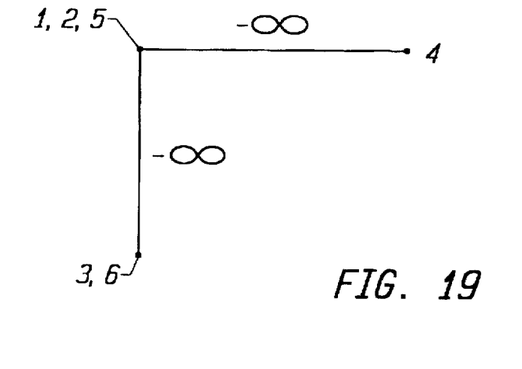
FIG. 19 is a reproduction of the graph of FIG. 18 after the merger of a pair of vertices and their associated edges.

Referring to FIG. 19, merging the vertices 3 and 6 results in three vertices comprising vertex 1,2,5, vertex 4 and vertex 3,6. Because, as indicated above, the vertex 1,2,5 comprises a maximum size cluster, no further combinations are allowed. Thus, each of the edges extending from vertex 1,2,5 are given the score of $-\infty$, ending the clustering of the data.

While preferred embodiments of the present invention are described above, it is contemplated that numerous modifications may be made thereto for particular applications without departing from the spirit and scope of the present invention. For example, the present invention is not limited to the clustering of map features but can be used to cluster anything distributed in two or more dimensions such as, for example, components on a printed circuit board, nodes in a graph, people by common interest, stars in space, etc. Accordingly, it is intended that the embodiments described be considered only as illustrative of the present invention and that the scope thereof should not be limited thereto but be determined by reference to the claims hereinafter provided.

What is claimed is:

1. A method of clustering multi-dimensional related data in a computer database, said computer database including a set of data records, each data record storing information about an object of interest, comprising the steps of:

a. establishing a vertex for every object of interest in said computer database so as to provide a graph comprising a plurality of vertices, each vertex representing a cluster;

b. connecting selected pairs of said plurality of vertices with edges;

c. calculating, on a computer, a score for the edges connecting the vertices, the score being a measure of how desirable it is to combine the vertices associated therewith;

d. selecting two vertices connected with an edge having the best score;

e. combining the two vertices by combining the clusters represented by the two vertices;

f. creating a new merged vertex and edges and calculating on a computer a new score for the new edges;

g. repeating steps (d) through (f) until a predetermined terminating condition is reached; and h. storing remaining clusters in a computer readable medium.

2. A method according to claim 1 wherein said steps of establishing a vertex and connecting selected pairs comprise the steps of:

i) identifying features corresponding to areas and line segments on a two dimensional surface;

j) creating a separate vertex for each identified area and line segment; and k) creating an edge from the vertex corresponding to each identified area to the vertex corresponding to each identified line segment bounding the area.

3. A method according to claim 1 wherein:

said step of establishing a vertex comprises the step of identifying features corresponding to areas and line segments on a two dimensional surface; and said step of calculating a score comprises the step of selectively assigning a score which is:

i) equal to an area of a box bounding a first cluster plus an area of a box bounding a second cluster minus the area of a box bounding a combination of said first and second clusters, if said combination has a data record below a predetermined maximum size, or ii) equal to negative infinity ($-\infty$) if said combination's data record is equal to or above said predetermined maximum size.

4. A method according to claim 1 wherein said step of calculating a score comprises the step of selectively assigning a score which is equal to a sum of the scores of edges which a newly created edge replaces.

5. A method according to claim 1, further comprising the step of:

generating and maintaining a list of vertices in which there is listed for each vertex the score of a best edge connected to that vertex and the other vertex to which that best edge connects.

6. A method according to claim 5, wherein the step of generating and maintaining a list of vertices comprises the step of sorting said list by score.

7. A method according to claim 1, further comprising the steps of repeating steps (c) through (g).

8. A method according to claim 7, wherein each repetition of said steps (c) and (f) includes using a different method of scoring the edges.

9. A method according to claim 8 wherein said step (g) comprises a different and greater predetermined terminating condition with each repetition of steps (c) through (g).

10. A method according to claim 1, further comprising the step of identifying pairs of vertices not yet connected by an edge that it is desirable to combine and connecting each such pair of vertices with an edge during each repetition of steps (d) through (f).

11. A method according to claim 1, wherein the data being clustered is geographic map data.

12. A method according to claim 1, further comprising the step of suppressing vertices and associated edges representing objects for which there is no desire to maintain data in the database so as to leave a plurality of vertices representing features for which data is present in the database.

13. A method according to claim 1, wherein said predetermined terminating condition of step (g) is reached at when any further combining of clusters would exceed a predefined limit.

14. A method of clustering multi-dimensional related data in a computer data base, said computer database including a set of data records, each data record storing information about an object of interest, comprising the steps of:

creating a vertex for at least a subset of objects of interest in said computer database, each of said vertices representing a cluster;

connecting pairs of vertices with edges, each edge connecting two vertices;

calculating a score for the edges connecting the vertices using a computer, the score being a measure of how desirable it is to combine the vertices associated therewith;

selecting one edge having a score indicating a high desirability to combine said two vertices connected by said one edge;

combining the clusters represented by the two vertices connected by said one edge, the combination resulting in a new cluster;

creating a new merged vertex representing the new cluster;

connecting the new merged vertex and at least one pre-existing vertex with one or more new edges;

calculating a new score for the one or more new edges; and storing remaining clusters in a computer readable medium.

15. A method according to claim 14, wherein:

the step of creating a vertex for at least a subset includes the step of identifying features corresponding to areas and line segments on a two dimensional surface and creating a separate vertex for each identified area and line segment; and the step of connecting pairs includes the step of creating an edge from the vertex corresponding to each identified area to the vertex corresponding to each identified line segment bounding the area.

16. A method according to claim 14, wherein:

the step of calculating a score includes the step of selectively assigning a score which is equal to:

i) the area of a box bounding a first cluster plus the area of a box bounding a second cluster minus the area of a box bounding the a combination of the first and second clusters, if the combination has a data record below a predetermined maximum size, or ii) negative infinity ($-\infty$) if the combination's data record is equal to or above the predetermined maximum size.

17. A method according to claim 14, further including the steps of:

removing at least one vertex, said one vertex connected to one or more other vertices by one or more edges;

removing said one or more edges; and connecting each of the one or more other vertices to at least another of the one or more other vertices.

18. A computer readable storage medium having computer readable code embodied on said computer readable storage medium, said computer readable code for clustering multi-dimensional related data in a computer database, said computer database including a set of data records, each data record storing information about an object of interest, said computer readable code comprising:

first program code, said first program code establishes a vertex for at least a subset of objects of interest in said computer database, each of said vertices representing a cluster;

second program code, said second program code connects selected pairs of said vertices with edges, each edge connecting two vertices;

third program code, said third program code calculates a score for the edges connecting the vertices, the score being a measure of how desirable it is to combine the vertices associated therewith;

fourth program code, said fourth program code selects two vertices connected with one edge having a score indicating a high desirability to combine the two vertices;

fifth program code, said fifth program code combines the selected two vertices including combining the clusters represented by the selected two vertices;

sixth program code, said sixth program code creates a new merged vertex and edges and calculates a new score for the new edges; and seventh program code, said seventh program code stores remaining clusters in a computer readable medium.

19. A computer readable storage medium according to claim 18, wherein:

said first program code identifies features corresponding to areas and line segments on a two dimensional surface and creates a separate vertex for each identified area and line segment; and said second program code creates an edge from the vertex corresponding to each identified area to the vertex corresponding to each identified line segment bounding the area.

20. A computer readable storage medium according to claim 19, wherein:

said third program code selectively assigns a score which is equal to:

i) an area of a box bounding a first cluster plus an area of a box bounding a second cluster minus an area of a box bounding a combination of the first and second clusters, if the combination has a data record below a predetermined maximum size, or ii) negative infinity ($-\infty$) if the combination's data record is equal to or above the predetermined maximum size.

21. A computer readable storage medium according to claim 18, wherein:

said third program code selectively assigns a score which is equal to a sum of the scores of edges which a newly created edge replaces.

22. A computer readable storage medium according to claim 18, further including:

eighth program code, said eighth program code:

removes at least one vertex, the one vertex connected to one or more other vertices by one or more edges;

removes the one or more edges; and connects each of the one or more other vertices to at least another of the one or more other vertices.

* * * * *

UNITED STATES PATENT AND TRADEMARK OFFICE
CERTIFICATE OF CORRECTION

PATENT NO. : 5,706,503
DATED : January 6, 1998
INVENTOR(S) : Poppen, et al.

It is certified that error appears in the above-identified patent and that said Letters Patent is hereby corrected as shown below:

```
On the title page: Item [73]
    Cover page: ADD --Assignee: Etak, Inc.--.

Item [56]
```

Cover page: ADD --Attorney, Agent, or Firm--Fliesler, Dubb, Meyer & Lovejoy LLP--.

Signed and Sealed this

Twenty-sixth Day of September, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,706,503
DATED : January 6, 1998
INVENTOR(S) : Richard F. Poppen et al.

It is certified that error appears in the above-identified patent and that said Letters Patent is hereby corrected as shown below:

Title page,
Item [54], Title, please correct the title from:
"METHOD OF CLUSTERING MULTI-DIMENSIONAL RELATED DATA IN A COMPUTER DATABASE BY COMBINING THE TWO VERTICLES OF A GRAPH CONNECTED BY AN EDGE HAVING THE HIGHEST SCORE" to:
-- METHOD OF CLUSTERING MULTI-DIMENSIONAL RELATED DATA IN A COMPUTER DATABASE BY COMBINING THE TWO VERTICES OF A GRAPH CONNECTED BY AN EDGE HAVING THE HIGHEST SCORE --.
Insert Items:
-- [73] Assignee: Etak, Inc. --; and
-- [74] *Attorney, Agent, or Firm*—Fliesler, Dubb, Meyer & Lovejoy LLP --.

Signed and Sealed this

Eighth Day of November, 2005

JON W. DUDAS
*Director of the United States Patent and Trademark Office*